United States Patent
Ahmadloo et al.

(10) Patent No.: US 10,814,583 B2
(45) Date of Patent: Oct. 27, 2020

(54) TOUGHENING OF LAMINATED COMPOSITES BY NANOFIBER YARN

(71) Applicants: Elaheh Ahmadloo, Tehran (IR); Masoud Latifi, Tehran (IR); Ali Akbar Gharehaghaji, Tehran (IR); Hamed Saghafi, Tehran (IR)

(72) Inventors: Elaheh Ahmadloo, Tehran (IR); Masoud Latifi, Tehran (IR); Ali Akbar Gharehaghaji, Tehran (IR); Hamed Saghafi, Tehran (IR)

(*) Notice: Subject to any disclaimer, the term of this patent is extended or adjusted under 35 U.S.C. 154(b) by 158 days.

(21) Appl. No.: 15/935,011

(22) Filed: Mar. 25, 2018

(65) Prior Publication Data
US 2018/0207905 A1    Jul. 26, 2018

Related U.S. Application Data

(60) Provisional application No. 62/492,300, filed on May 1, 2017.

(51) Int. Cl.
*B29C 70/22* (2006.01)
*B32B 5/06* (2006.01)
(Continued)

(52) U.S. Cl.
CPC ............... *B32B 5/06* (2013.01); *B29C 70/081* (2013.01); *B29C 70/443* (2013.01); *B32B 5/10* (2013.01);
(Continued)

(58) Field of Classification Search
CPC ...... B29C 70/081; B29C 70/443; B29C 70/22
See application file for complete search history.

(56) References Cited

U.S. PATENT DOCUMENTS

| 4,162,496 A | * | 7/1979 | Downen | H01Q 17/004 342/4 |
| 5,221,390 A | * | 6/1993 | Persson | B65H 57/28 156/164 |

(Continued)

FOREIGN PATENT DOCUMENTS

WO    WO-2016015736 A1 *    2/2016    ............... B32B 5/26

OTHER PUBLICATIONS

Hajiani, F., A.A.A. Jeddi, A.A. Gharehaghaji, An Investigation on the Effects of Twist on Geometry of the Electrospinning Triangle and Polyamide 66 Nanofiber Yarn Strength, Fibers and Polymers, vol. 13, No. 2 (2012), pp. 244-252. (Year: 2012).*

(Continued)

*Primary Examiner* — Matthew J Daniels
(74) *Attorney, Agent, or Firm* — Bajwa IP Law Firm; Haris Zaheer Bajwa

(57) ABSTRACT

A method for enhancing fracture toughness of a composite laminate is disclosed. The method includes fabricating a nanofiber yarn, forming a nanofiber yarn layer by aligning the nanofiber yarn in form of a layer, forming a laminated structure by interleaving the nanofiber yarn layer into a plurality of fabric layers, forming the composite laminate by subjecting the laminated structure to a vacuum infusion process (VIP), and curing the composite laminate. Forming the laminated structure includes stacking a plurality of fabric layers onto each other and placing the nanofiber yarn layer between two fabric layers of the plurality of fabric layers. The VIP includes forming a sealed laminated structure by sealing the laminated structure, forming a vacuumed laminated structure by vacuuming the sealed laminated structure, and introducing a resin matrix into the vacuumed laminated structure.

12 Claims, 23 Drawing Sheets

(51) Int. Cl.
| | |
|---|---|
| B32B 5/10 | (2006.01) |
| B32B 37/12 | (2006.01) |
| B32B 37/06 | (2006.01) |
| B32B 37/10 | (2006.01) |
| B29C 70/44 | (2006.01) |
| B29C 70/08 | (2006.01) |
| B29K 105/12 | (2006.01) |
| B82Y 40/00 | (2011.01) |

(52) U.S. Cl.
CPC .......... *B32B 37/06* (2013.01); *B32B 37/1018* (2013.01); *B32B 37/1284* (2013.01); *B29K 2105/124* (2013.01); *B32B 2260/023* (2013.01); *B32B 2260/046* (2013.01); *B32B 2262/0261* (2013.01); *B32B 2262/0269* (2013.01); *B32B 2262/065* (2013.01); *B32B 2262/101* (2013.01); *B32B 2262/106* (2013.01); *B32B 2307/558* (2013.01); *B82Y 40/00* (2013.01)

(56) References Cited

U.S. PATENT DOCUMENTS

| | | |
|---|---|---|
| 6,265,333 B1 | 7/2001 | Dzenis et al. |
| 2004/0219855 A1* | 11/2004 | Tsotsis ............... B32B 5/26 442/364 |
| 2004/0241415 A1* | 12/2004 | Wadahara ............ B29C 70/226 428/298.1 |

OTHER PUBLICATIONS

Lee, J.S., S.J. Hong, W.-R. Yu, T.J. Kang, The effect of blank holder force on the stamp forming behavior of non-crimp fabric with a chain stitch, Composites Science and Technology, vol. 67 (2007), pp. 357-366. (Year: 2007).*

Akangah, P., et al., Effect of Nylon-66 nano-fiber interleaving on impact damage resistance of epoxy/carbon fiber composite laminates, Composite Structures, vol. 92 (2010), pp. 1432-1439. (Year: 2010).*

Daelemans, L., et al., Using aligned nanofibers for identifying the toughening micromechanisms in nanofibre interleaved laminates, Composites Science and Technology, vol. 124 (2016), pp. 17-26. (Year: 2016).*

Daelemans, L., et al., Damage-Resistant Composites Using Electrospun Nanofibers: A Multiscale Analysis of the Toughening Mechanisms, ACS Appl. Mater. Interfaces, vol. 8 (2016), pp. 11806-11818. (Year: 2016).*

H. Saghafi, A. Zucchelli, R. Palazzetti, G. Minak; "The effect of interleaved composite nanofibrous mats on delamination behavior of polymeric composite materials"; Composite Structures, 2014, pp. 41-47, vol. 109.

F. Bovicelli, H. Saghafi, T. M. Brugo, J. Belcari, A. Zucchelli, G. Minak; "On consideration the mode I fracture response of CFRP composite interleaved by composite nanofibers"; Procedia Materials Science, 2014, pp. 1316-1321, vol. 3.

F. Dabirian, S. A. Hosseini; "Novel Method for Nanofibre Yarn Production Using Two Differently Charged Nozzles"; Fibres & Textiles in Eastern Europe, 2009, pp. 45-47, vol. 17, No. 3 (74).

* cited by examiner

300

703

TOUGHENING OF LAMINATED COMPOSITES BY NANOFIBER YARN

CROSS-REFERENCE TO RELATED APPLICATION

This application claims the benefit of priority from U.S. Provisional Patent Application Ser. No. 62/492,300 filed on May 1, 2017, and entitled "NANOFIBER YARN TOUGHENED POLYMERIC COMPOSITE LAMINATES", which is incorporated herein by reference in its entirety.

SPONSORSHIP STATEMENT

This application has been sponsored by Iran Patent Office, which does not have any rights in this application.

TECHNICAL FIELD

The present disclosure generally relates to reinforcing and toughening of composite laminates, and particularly, to a method for enhancing fracture toughness of composite laminates using a nanofiber yarn.

BACKGROUND

Laminates, a widespread kind of composite material, are extensively used for various engineering applications such as aircraft, space, marine, armor, automotive and civil engineering applications. Failure mode of these materials in the form of delamination emanates from their low toughness; therefore, finding approaches to improve fracture toughness of composite laminates has attracted considerable attention. There are different approaches to modifying delamination phenomena such as stitching, braiding and toughening the matrix. In the methods of toughening the matrix, a toughening component is embedded in the composite laminates that can be in form of film, particle or fiber.

Among all toughening components, fibers, especially nanofibers, have been used preferably because of the high surface area to volume ratio and porous media provided by nanofiber structures. These characteristics result in large fiber/matrix interfacial areas, so stress can be transferred from the matrix to fibers significantly. Diverse electrospun nanofibers such as Cellulose Nanofibers (CNF), Polyacrylonitrile (PAN) nanofibers, Cellulose Acetate (CA) nanofibers, Polyurethane (PU) nanofibers, polyvinyl alcohol (PVA) nanofibers, Polyvinylidene Fluoride (PVDF) nanofibers, Polycaprolactone (PCL) nanofibers, and mainly polyamide (PA) nanofibers has been utilized in fiber reinforced composites as the toughener element. Nanofibers are mostly produced in form of a nonwoven layer, usually referred to as a web or a mat, which has been utilized for toughening composite laminates by different mechanisms such as bridging between layers and crack deviation. For instance, applying a Nylon 66 web in composite laminates leads to a maximum increase of about 300% in fracture toughness, which is still low for various applications of composite laminates.

Hence, there is a need for more efficient and inexpensive methods utilizing nanofibers in composite laminates structures leading to better fracture toughness and mechanical properties. Additionally, there is a need for composite laminates with enhanced mechanical properties, particularly, enhanced fracture toughness suitable for use in several applications such as automobiles, aircrafts, and marine structures.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for fabricating a composite laminate with enhanced fracture toughness. The method may include fabricating a nanofiber yarn, forming a nanofiber yarn layer by aligning the nanofiber yarn in form of a layer, forming a laminated structure by interleaving the nanofiber yarn layer into a plurality of fabric layers, forming the composite laminate by subjecting the laminated structure to a vacuum infusion process (VIP), and curing the composite laminate. Forming the laminated structure may include stacking a plurality of fabric layers onto each other and placing the nanofiber yarn layer between two fabric layers of the plurality of fabric layers. The VIP may include forming a sealed laminated structure by sealing the laminated structure, forming a vacuumed laminated structure by vacuuming the sealed laminated structure, and introducing a resin matrix into the vacuumed laminated structure. In an exemplary embodiment, the plurality of fabric layers may include one of glass fabric layers, carbon fabric layers, Aramid fabric layers, Kenaf fabric layers, and combinations thereof.

In an exemplary implementation, fabricating the nanofiber yarn may include fabricating a plurality of nanofibers by electrospinning technique, forming the nanofiber yarn by twist inserting to the plurality of nanofibers, and collecting the nanofiber yarn by moving the nanofiber yarn towards a take-up roller. In one exemplary embodiment, forming the nanofiber yarn by twist inserting to the plurality of nanofibers and moving the nanofiber yarn towards the take-up roller are done simultaneously.

In an exemplary embodiment, the plurality of nanofibers may include a plurality of polymeric nanofibers made of one of Nylon nanofibers, Polyamide (PA) nanofibers, and combinations thereof. In an exemplary embodiment, the plurality of nanofibers may include Nylon 66 nanofibers or PA66 nanofibers.

In an exemplary embodiment, forming the nanofiber yarn layer by aligning the nanofiber yarn may include forming the nanofiber yarn layer by aligning the nanofiber yarn with a crossed angle on a frame and separating the nanofiber yarn layer from the frame. In an exemplary implementation, forming the nanofiber yarn layer by aligning the nanofiber yarn with a crossed angle on the frame may include forming a first aligned layer by aligning the nanofiber yarn with a first angle on the frame and forming a second aligned layer by aligning the nanofiber yarn with a second angle on the first aligned layer on the frame. Where, forming the first aligned layer and forming the second aligned layer are repeated iteratively. In an exemplary embodiment, the crossed angle may include a ±45 degree angle; the first angle may include a +45 degree angle, and the second angle may include a −45 degree angle.

In an exemplary implementation, forming the sealed laminated structure by sealing the laminated structure may include sealing the laminated structure by enclosing the laminated structure with a paste. In an exemplary implementation, forming the vacuumed laminated structure may include vacuuming the sealed laminated structure by a vacuum pump with a pressure of about −0.8 bar.

In an exemplary implementation, the resin matrix may include a resin and a hardener. In an exemplary embodiment, the resin may include a thermoset resin, for example, one of an epoxy resin, a polyester resin, and combinations thereof.

In an exemplary implementation, introducing the resin matrix into the vacuumed laminated structure may include suction of the resin matrix into the vacuumed laminated using a vacuum pump. In an exemplary implementation, curing the composite laminate may include maintaining the composite laminate at a temperature between about 20° C. and about 260° C.

In another exemplary implementation, a method for fabricating a composite laminate with enhanced fracture toughness is disclosed. The method may include fabricating a nanofiber yarn, forming a nanofiber yarn layer by aligning the nanofiber yarn in form of a layer, forming a prepreg laminated structure by interleaving the nanofiber yarn layer into a plurality of prepregs, forming a prepreg composite laminate, and curing the prepreg composite laminate. Forming the prepreg laminated structure may include stacking a plurality of prepregs onto each other and placing the nanofiber yarn layer between two prepregs of the plurality of prepregs. Forming the prepreg composite laminate may include forming a sealed prepreg laminated structure by sealing the prepreg laminated structure and forming a vacuumed prepreg laminated structure by vacuuming the sealed prepreg laminated structure. In an exemplary embodiment, curing the prepreg composite laminate may include maintaining the prepreg composite laminate at a temperature between about 50° C. and about 200° C.

In another exemplary embodiment of the present disclosure, a toughened composite laminate is disclosed. The toughened composite laminate may include a plurality of fabric layers, a nanofiber yarn layer, which may be interleaved between two fabric layers of the plurality of fabric layers, and a resin matrix, which may include a resin and a hardener. Where, each fabric layer of the plurality of fabric layers and the nanofiber yarn layer may be impregnated by the resin matrix.

In an exemplary embodiment, the plurality of fabric layers may include one of glass fabric layers, carbon fabric layers, Aramid fabric layers, Kenaf fabric layers, and combinations thereof. In an exemplary embodiment, the nanofiber yarn layer may include a layer of aligned nanofiber yarn, which may include twisted nanofibers including one of Nylon nanofibers, Polyamide (PA) nanofibers, and combinations thereof. In an exemplary embodiment, the twisted nanofibers may include Nylon 66 nanofibers or PA66 nanofibers. In an exemplary embodiment, the resin may include a thermoset resin, for example, one of an epoxy resin, a polyester resin, and combinations thereof.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
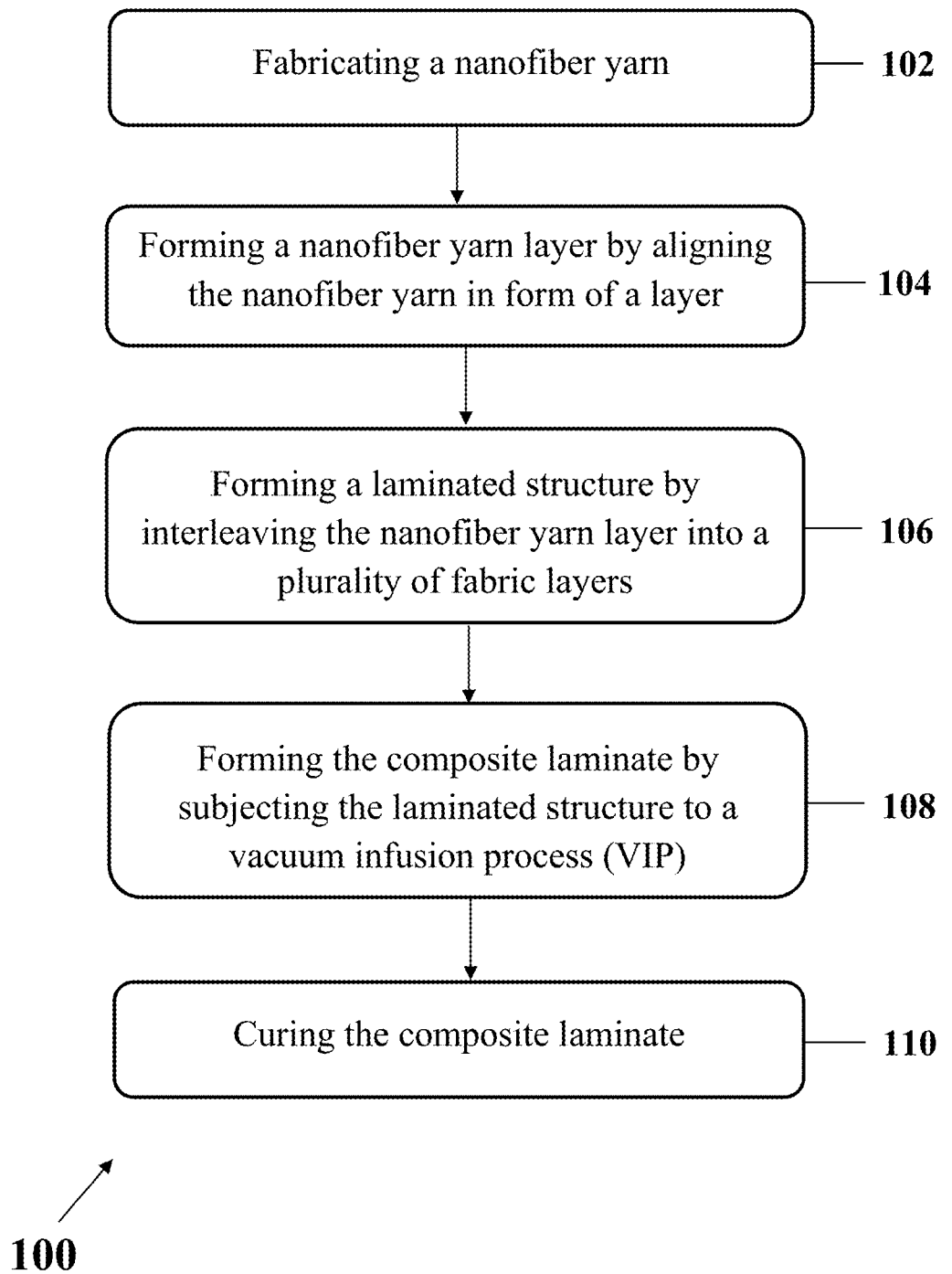
FIG. 1A illustrates a method for fabricating a composite laminate with enhanced fracture toughness, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Nanofibers may be used as reinforcement agents in composite laminates not only due to their high aspect ratio but also due to their capacity to be aligned. On the other hand, introduction of nanofibers into a resin matrix such as an epoxy matrix does not lead to viscosity build-up which often occurs in the presence of nanoparticles. Considerable approaches have been explored for toughening composite laminates by using nanofibers in form of a mat but nanofibers in form of yarn have not been utilized as a reinforcing component yet. Nanofiber mat have been used as toughener in composite laminate which results in about 200%-300% increase of fracture toughness, which may be still too low for some applications of composite laminates, for example, aircraft, space, marine, armor, automotive, and civil engineering applications.

Disclosed herein is an exemplary method for fabricating a composite laminate with enhanced fracture toughness. The method may include preparing a nanofiber yarn layer by aligning a nanofiber yarn and utilizing the nanofiber yarn layer for enhancing fracture toughness of exemplary composite laminate. Exemplary nanofiber yarn layer may lead to more enhanced fracture toughness of the composite laminate in comparison with a conventional nanofiber mat. Moreover, an exemplary toughened composite laminate is disclosed which may include a plurality of fabric layers, a nanofiber yarn layer, and a resin matrix. Exemplary nanofiber yarn layer may be interleaved between two fabric layers of the plurality of fabric layers, and the nanofiber yarn layer and the plurality of fabric layers may be impregnated by the resin matrix, resulting in a consolidated laminated structure.

In an aspect of the present disclosure, an exemplary method for fabricating a composite laminate with enhanced fracture toughness is disclosed. The method may include interleaving a nanofiber yarn layer into the composite laminate structure that may significantly enhance the fracture toughness of the composite laminate. Exemplary method may include forming the nanofiber yarn layer by aligning an exemplary electrospun fabricated nanofiber yarn in form of a layer, which may be interleaved into the composite laminate.

FIG. 1A shows an exemplary method 100 for fabricating a composite laminate with enhanced fracture toughness, consistent with one or more exemplary embodiments of the present disclosure. Method 100 may include fabricating a nanofiber yarn (step 102), forming a nanofiber yarn layer by aligning the nanofiber yarn in form of a layer (step 104), forming a laminated structure by interleaving the nanofiber yarn layer into a plurality of fabric layers (step 106), forming the composite laminate by subjecting the laminated structure to a vacuum infusion process (VIP) (step 108), and curing the composite laminate (step 110).

Figure 1B:
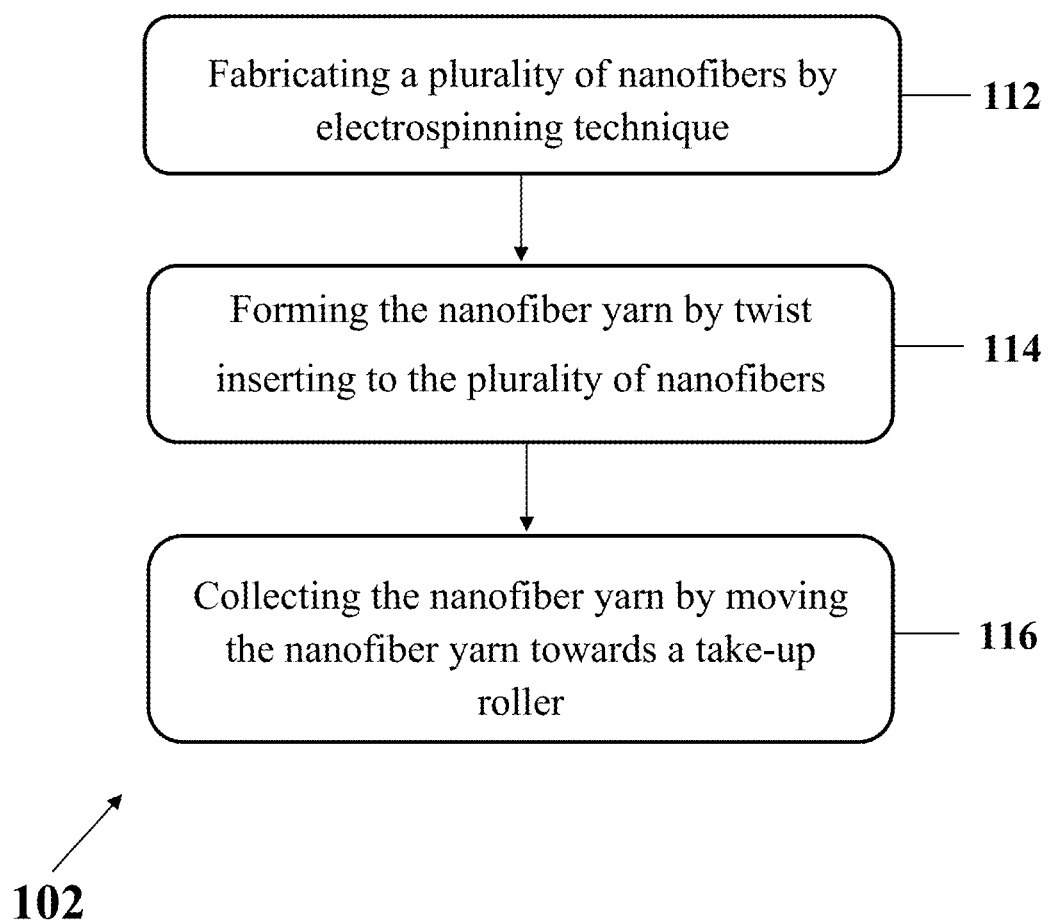
FIG. 1B illustrates a process for fabricating the nanofiber yarn, consistent with one or more exemplary embodiments of the present disclosure.

Step 102 may include fabricating the nanofiber yarn. FIG. 1B shows an exemplary implementation of step 102 including an exemplary process for fabricating the nanofiber yarn, consistent with exemplary embodiments of the present disclosure. Fabricating the nanofiber yarn (step 102) may include fabricating a plurality of nanofibers by electrospinning technique (step 112), forming the nanofiber yarn by twist inserting to the plurality of nanofibers (step 114), and collecting the nanofiber yarn by moving the nanofiber yarn towards a take-up roller (step 116). Where, forming the nanofiber yarn by twist inserting to the plurality of nanofibers and moving the nanofiber yarn towards the take-up roller may be done simultaneously. Herein, "twist inserting" refers to twisting the plurality of nanofibers to form the nanofiber yarn.

In an exemplary implementation, the plurality of nanofibers may include a plurality of polymeric nanofibers made of Nylon nanofibers, Polyamide (PA) nanofibers, or combinations thereof. In an exemplary embodiment, the plurality of nanofibers may include a plurality of Nylon 66 nanofibers or PA66 nanofibers.

Desirable mechanical properties such as stress strength, elastic modulus, hardness, capacity to absorb impact energy, thermal stability, and low density in addition to the satisfactory electrospinning ability of PA makes it a prevalent polymer for fabricating the nanofiber yarn, which may be aid in enhancing the fracture toughness of a composite laminate as described herein.

Figure 2:
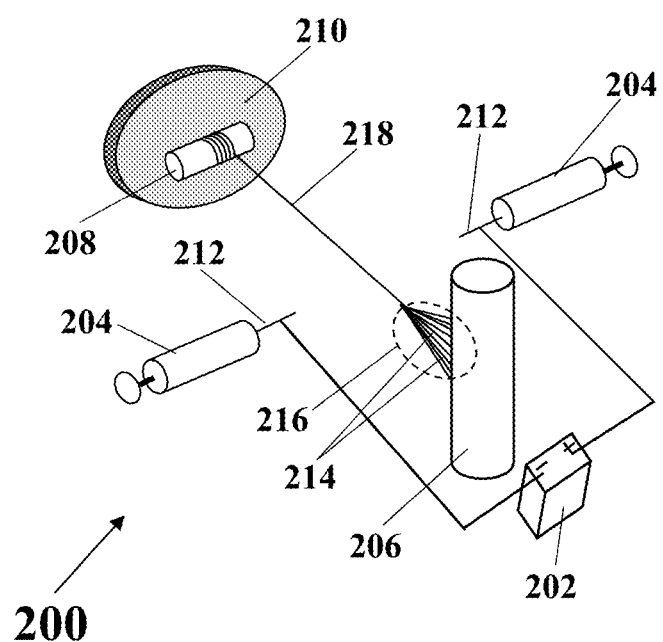
FIG. 2 illustrates a schematic view of a yarn electrospinning system, consistent with one or more exemplary embodiments of the present disclosure.

In an exemplary implementation, fabricating the nanofiber yarn (step 102) may be carried out using a yarn electrospinning system. FIG. 2 shows a schematic view of an exemplary implementation of the yarn electrospinning system 200, consistent with one or more exemplary embodiments of the present disclosure. Exemplary yarn electrospinning system 200 may include a high-voltage power supply 202, feed pumps 204, a neutral cylinder 206, a take-up roller 208, and a twist unit 210.

In an exemplary implementation, feed pumps 204 may include at least one feed pump, for example, two feed pumps 204 that are shown in FIG. 2. In an exemplary embodiment, two feed pumps 204 may include two syringe pumps.

Exemplary feed pumps 204 may include flat-tipped nozzles 212, which may be adversely charged by the high-voltage power supply 202.

Step 112 may include fabricating the plurality of nanofibers by an exemplary electrospinning technique. Referring to FIG. 2, fabricating exemplary plurality of nanofibers 214 using the yarn electrospinning system 200 may include injecting a polymeric solution, for example, a PA66/formic acid solution by feed pumps 204 through the flat-tipped nozzles 212, the respective flat-tipped nozzles 212 may be charged by equal amounts of voltage with opposite polarization. Owing to an electric field, which may be built up between the respective flat-tipped nozzles 212, a plurality of nanofibers 214 may be fabricated and discharged on neutral cylinder 206. The plurality of nanofibers 214 may be deposited on a piecing yarn which may be initially placed on the take-up roller 208 and bridged to the neutral cylinder 206. Consequently, an electrospinning triangle 216 may be formed.

Step 114 may include forming exemplary nanofiber yarn 218 by twist inserting to the plurality of nanofibers 214, which may be done simultaneously with step 116 that may include collecting the nanofiber yarn 218 by moving the nanofiber yarn 218 towards the take-up roller 208. In an exemplary embodiment, as the piecing yarn may be winded by the take-up roller 208 and a twist may be inserted into the electrospinning triangle 216 by rotating the twist unit 210, nanofiber yarn 218 may be formed (step 114) and exemplary formed nanofiber yarn 218 may be simultaneously drawn from the end of electrospinning triangle towards the take-up roller 208 (step 116). So nanofiber yarn 218 may be collected around the take-up roller 208.

In an exemplary embodiment, take-up roller 208 may be installed on the twist unit 210 which may include a rotating plate. Therefore, a winding speed of the take-up roller 208 and a rotational speed of the twist unit 210 may affect the twist level of produced nanofiber yarn 218. Herein, a "twist level" may refer to the number of twists in one meter of exemplary nanofiber yarn 218. The "twist level" may refer to the number of twists which may be inserted to exemplary plurality of nanofibers 214, for example, the twist level of exemplary produced nanofiber yarn 218 herein may be equal to 1000 twists per meter (1000 TPM). Since twist levels of nanofiber yarn 218 may affect the electrospinning triangle 216 height and width as well as electrospinning stability, finding optimal levels of this parameter may be of prime importance. Therefore, optimized twist may be attained by trial and error, for example, different twist levels of 1000 TPM (twist per meter) to 9000 TPM (twist per meter) may be applied to obtain the optimized twist value.

Figure 1C:
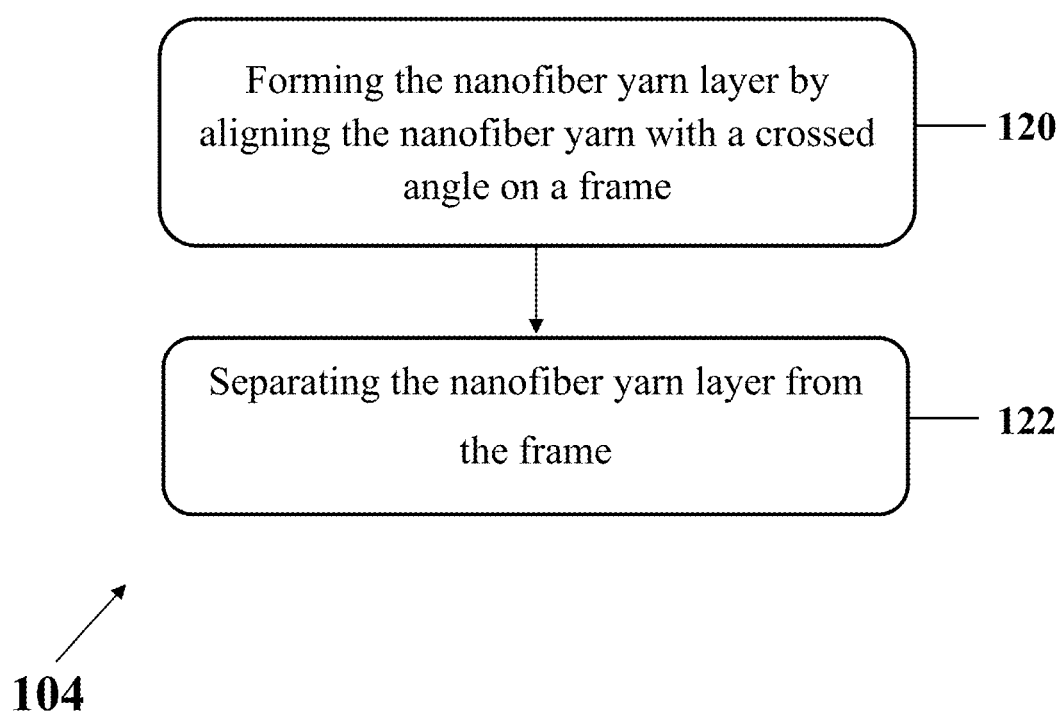
FIG. 1C illustrates a process for forming the nanofiber yarn layer, consistent with one or more exemplary embodiments of the present disclosure.

Step 104 may include forming the nanofiber yarn layer by aligning exemplary nanofiber yarn 218 in form of a layer. FIG. 1C shows an exemplary implementation of step 104 including an exemplary process for forming the nanofiber yarn layer, consistent with exemplary embodiments of the present disclosure. Referring to FIG. 1C, forming the nanofiber yarn layer (step 104) may include forming the nanofiber yarn layer by aligning the nanofiber yarn 218 with a crossed angle on a frame (step 120) and separating the nanofiber yarn layer from the frame (step 122). In an exemplary embodiment, the frame may include a paperboard frame.

Herein, "aligning" may refer to orienting nanofiber yarn 218 in one or more directions repeatedly and with an ordered manner. Aligning exemplary nanofiber yarn 218 may lead to obtain a layer made of regularly aligned nanofiber yarn 218 along desired directions, for example, aligned along ±45 degree angle respective to the horizontal line frequently.

Step 120 may include forming the nanofiber yarn layer by aligning the nanofiber yarn 218 with a crossed angle on the frame. In an exemplary implementation, aligning the nanofiber yarn 218 with a crossed angle on the frame (step 120) may include forming a first aligned layer by aligning the nanofiber yarn 218 with a first angle on the frame and forming a second aligned layer by aligning the nanofiber yarn 218 with a second angle on the first aligned layer on the frame.

In an exemplary embodiment, the first aligned layer may include a layer of aligned nanofiber yarn 218 along a first direction such as +45 degree angle respective to the horizontal line of the frame, so that nanofiber yarn 218 may cover the frame in a regular pattern along a direction with +45 degree angle respective to the horizontal line. The second aligned layer may include a layer of aligned nanofiber yarn 218 along a second direction such as a direction with −45 degree angle respective to the horizontal line of the frame and on the first aligned layer on the frame. Therefore, the second aligned layer may cover the frame on the first aligned layer in a regular pattern along a direction with −45 degree angle respective to the horizontal line. In an exemplary embodiment, forming the first aligned layer and forming the second aligned layer may be repeated iteratively in order to obtain the nanofiber yarn layer with a desirable thickness, for example, about 100 μm to about 500 μm. In an exemplary embodiment, the crossed angle may include a ±45 degree angle, where the first angle may include a +45 degree angle and the second angle may include a −45 degree angle.

Figure 3A:
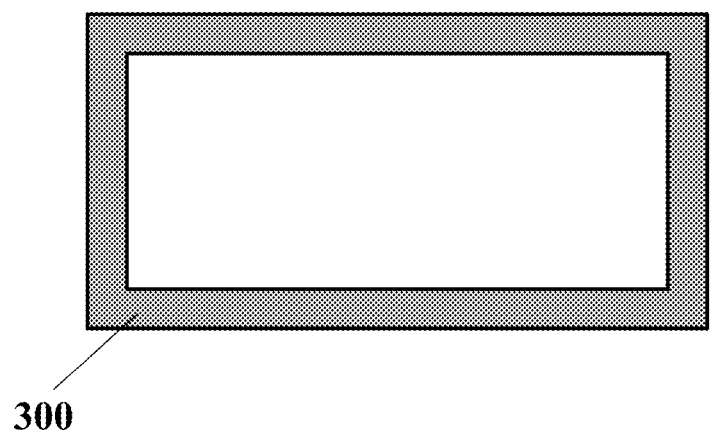
FIG. 3A illustrates a schematic view of a frame on which the nanofiber yarn layer may be formed, consistent with one or more exemplary embodiments of the present disclosure.
Figure 3B:
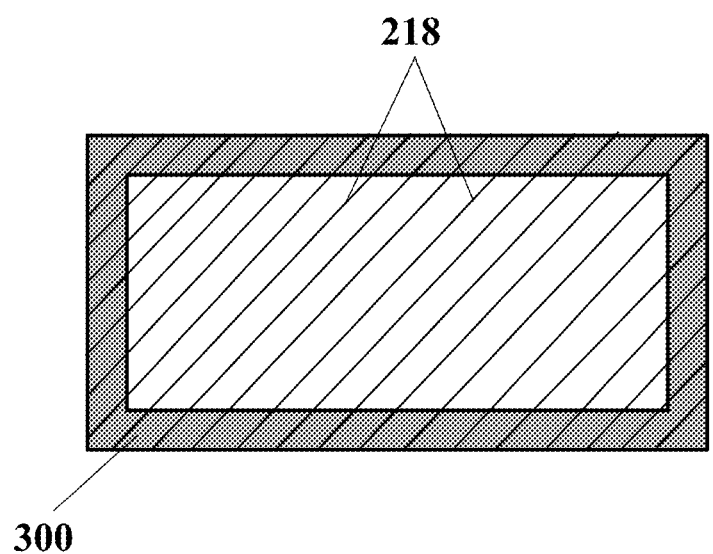
FIG. 3B illustrates a schematic view of a first aligned layer formed on the frame with +45 degree angle, consistent with one or more exemplary embodiments of the present disclosure.
Figure 3C:
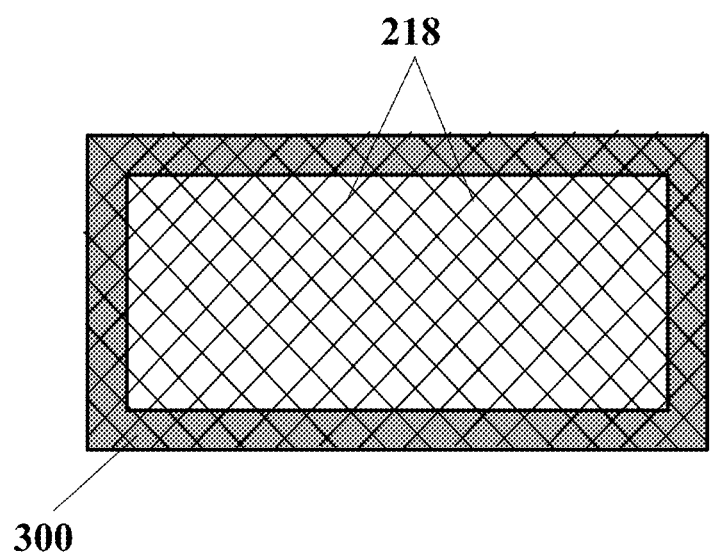
FIG. 3C illustrates a schematic view of a second aligned layer formed on the first aligned layer on the frame with −45 degree angle, consistent with one or more exemplary embodiments of the present disclosure.
Figure 3D:
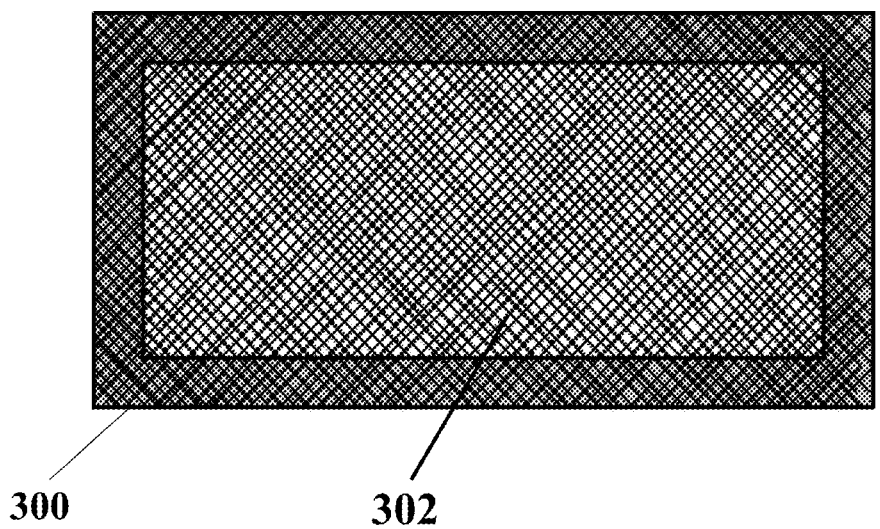
FIG. 3D illustrates a schematic view of a nanofiber yarn layer formed on the exemplary frame, consistent with one or more exemplary embodiments of the present disclosure.

FIGS. 3A-3D show a schematic view of an exemplary implementation of forming the nanofiber yarn layer by aligning the nanofiber yarn 218 with a crossed angle on the frame (step 120), consistent with one or more exemplary embodiments of the present disclosure. FIG. 3A shows a schematic view of an exemplary frame 300 on which the nanofiber yarn layer may be formed. Exemplary first aligned layer may be formed on frame 300 by aligning the nanofiber yarn 218 with exemplary first angle of about +45 degree (FIG. 3B). Thereafter, exemplary second aligned layer may be formed on the first aligned layer on frame 300 by aligning the nanofiber yarn 218 with exemplary second angle of about −45 degree (FIG. 3C). Forming of the first aligned layer and the second aligned layer may be repeated for several times. As a result, exemplary nanofiber yarn layer 302 may be formed as shown schematically in FIG. 3D.

Step 122 may include separating the nanofiber yarn layer 302 from the frame 300. The nanofiber yarn layer 302 may be removed from the frame 300 in order to utilize it as a layer of a composite laminate to enhance its fracture toughness.

Figure 1D:
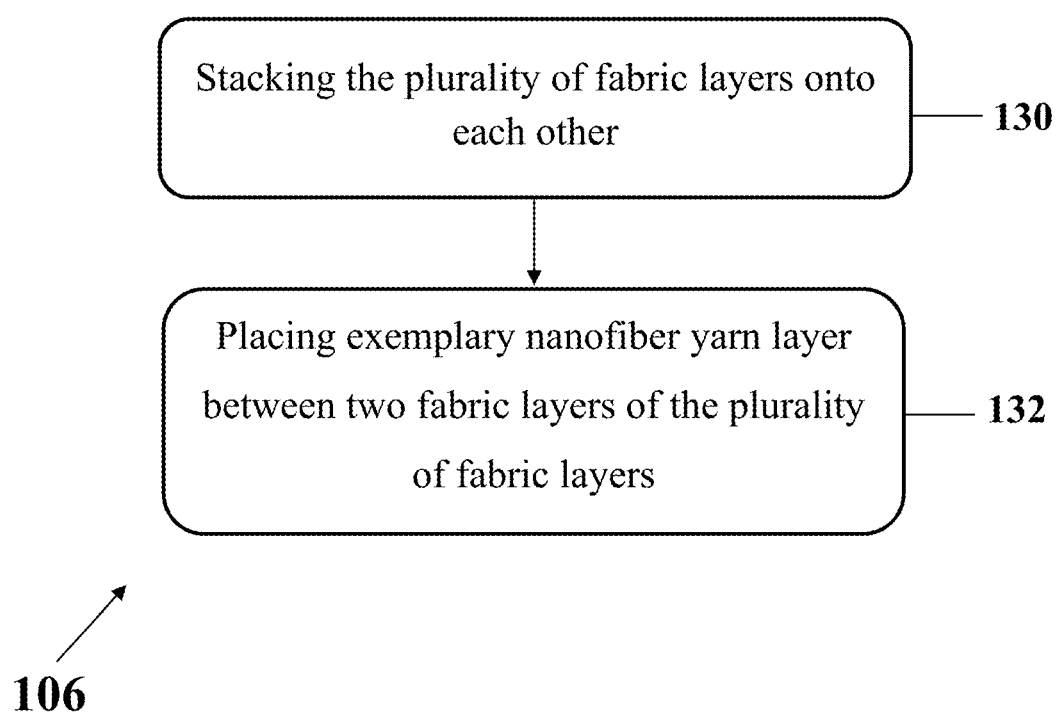
FIG. 1D illustrates a process for forming the laminated structure, consistent with one or more exemplary embodiments of the present disclosure.

Step 106 may include forming the laminated structure by interleaving the nanofiber yarn layer into the plurality of fabric layers. FIG. 1D shows an exemplary implementation of step 106 including an exemplary process for forming the laminated structure, consistent with one or more exemplary embodiments of the present disclosure. Referring to FIG. 1D, forming the laminated structure (step 106) may include stacking the plurality of fabric layers onto each other (step 130), and placing exemplary nanofiber yarn layer 302 between two respective fabric layers of the plurality of fabric layers (step 132). Where, the nanofiber yarn layer 302 may be placed between two respective fabric layers of the plurality of fabric layers (step 132) during stacking of the plurality of fabric layers onto each other (step 130); thereby, resulting in forming the laminated structure.

Figure 4:
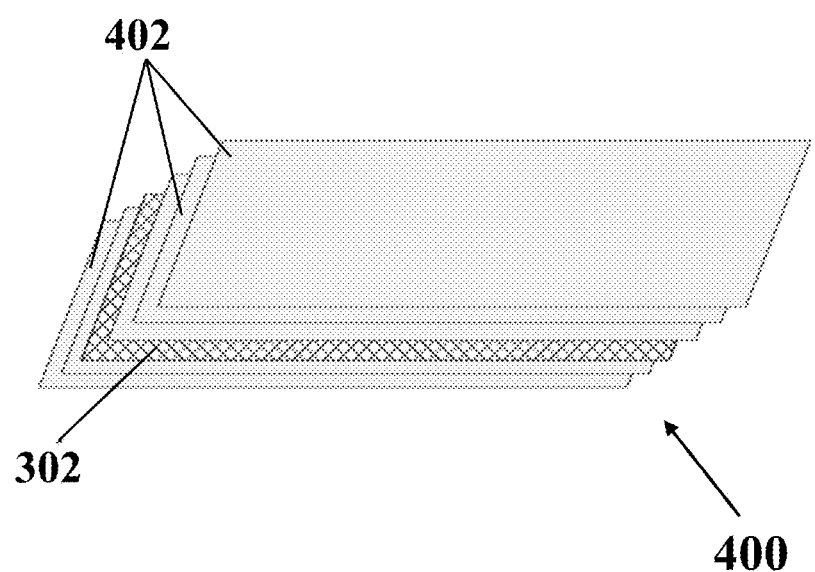
FIG. 4 illustrates a schematic view of an implementation of the laminated structure, consistent with one or more exemplary embodiments of the present disclosure.

FIG. 4 shows a schematic view of an exemplary implementation of the laminated structure 400 formed in step 106, consistent with one or more exemplary embodiments of the present disclosure. Referring to FIG. 4, the plurality of fabric layers 402 may be stacked onto each other and the nanofiber yarn layer 302 may be interleaved between two fabric layers of the plurality of fabric layers 402. In an exemplary embodiment, the plurality of fabric layers 402 may include glass fabric layers, carbon fabric layers, or Aramid fabric layers, for example, Kevlar®, Kenaf fabric layers, or combinations thereof.

Figure 1E:
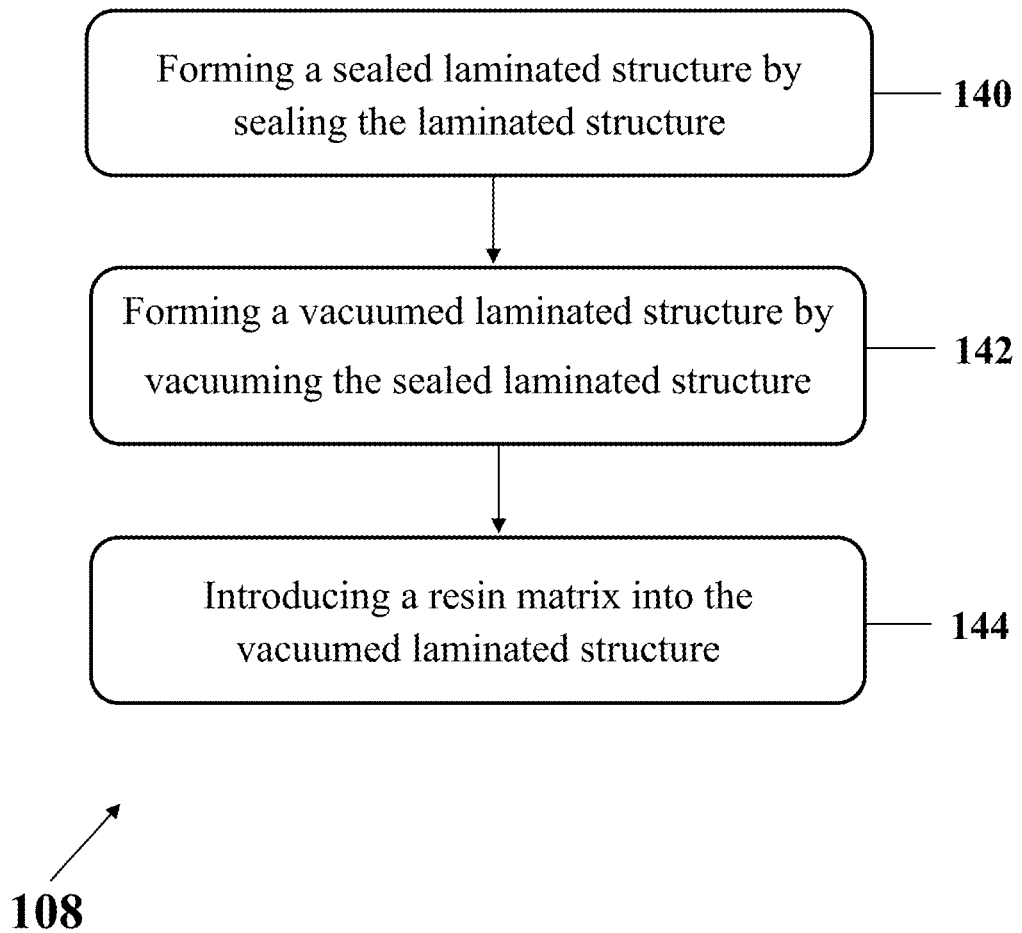
FIG. 1E illustrates an implementation of the vacuum infusion process (VIP) for forming the composite laminate, consistent with one or more exemplary embodiments of the present disclosure.

Step 108 may include forming the composite laminate by subjecting the laminated structure 400 to the vacuum infusion process (VIP). FIG. 1E shows an exemplary implementation of the VIP for forming the composite laminate, consistent with one or more exemplary embodiments of the present disclosure. Referring to FIG. 1E, the VIP may include forming a sealed laminated structure by sealing the laminated structure (step 140), forming a vacuumed laminated structure by vacuuming the sealed laminated structure (step 142), and introducing a resin matrix into the vacuumed laminated structure (step 144).

In an exemplary implementation, step 140 may include forming the sealed laminated structure by enclosing the laminated structure with a paste, for example, with bagging tape. The sealed laminated structure may be vacuumed in step 142. Step 142 may include vacuuming the sealed laminated structure by a vacuum pump to a pressure of about −0.8 bar.

In an exemplary implementation, step 144 may include introducing the resin matrix into the vacuumed laminated structure. In an exemplary embodiment, introducing the resin matrix into the vacuumed laminated structure may include adding the resin matrix by suction of the resin matrix into the vacuumed laminated using a vacuum pump. Introducing the resin matrix into the vacuumed laminated structure may lead to impregnate or saturate the plurality of fabric layers 402 and the nanofiber yarn layer 302 with the resin matrix.

In an exemplary embodiment, the resin matrix may include a resin and a hardener. The resin may include a thermoset resin, which may include an epoxy resin, a polyester resin, or combinations thereof. In an exemplary embodiment, the resin may include one of Polyester resin, Polyurethanes, Polyurea/polyurethane hybrids, Vulcanized rubber, Bakelite, Duroplast, Urea-formaldehyde foam, Melamine resin, Diallyl-phthalate (DAP), Epoxy resin, Epoxy novolac resins, Benzoxazines, Polyimides and Bismaleimides, Cyanate esters or polycyanurates, Mold or mold runners, Furan resins, Silicone resins, Thiolyte, Vinyl ester resins, and combinations thereof.

In an exemplary embodiment, the hardener may include a thermoset resin. In an exemplary embodiment, the hardener may include EPOLAM 2017 resin, EPOLAM 2018, or combinations thereof.

Step 110 may include curing the composite laminate. In an exemplary embodiment, curing the composite laminate may include maintaining the composite laminate at a temperature between about 20° C. and about 260° C. for about one week.

Figure 1F:
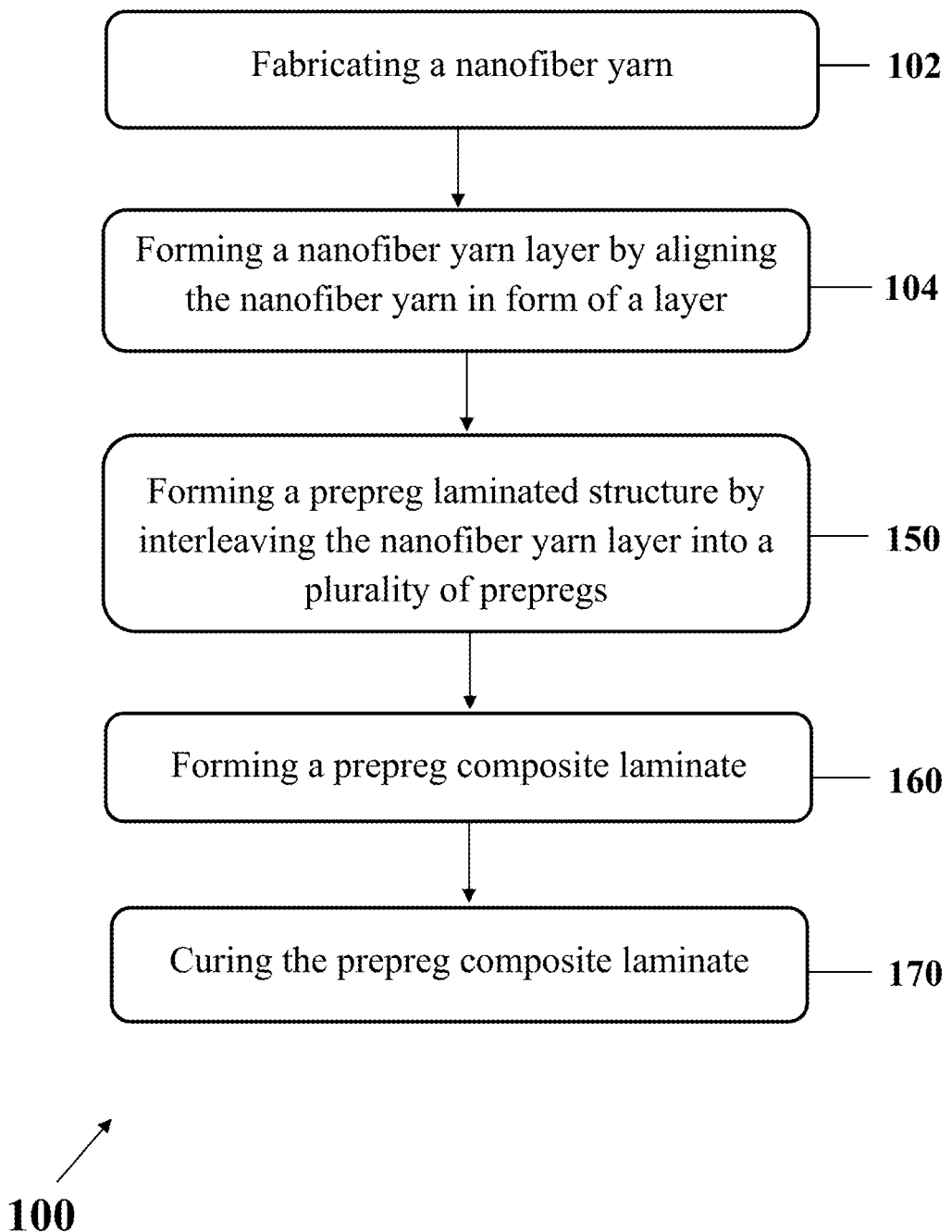
FIG. 1F illustrates another exemplary implementation of the method for fabricating the composite laminate with enhanced fracture toughness, consistent with one or more exemplary embodiments of the present disclosure.

FIG. 1F shows another exemplary implementation of method 100 for fabricating the composite laminate with enhanced fracture toughness, consistent with one or more exemplary embodiments of the present disclosure. Referring to FIG. 1F, exemplary nanofiber yarn layer 302 may be utilized for enhancing fracture toughness of a composite laminate, which may include a plurality of pre-impregnated fabric layers (prepregs). The plurality of prepregs may include a plurality of fabric layers, which may be impregnated or saturated with a resin matrix. In an exemplary embodiment, the resin matrix may include a resin and a hardener. The resin may include a thermoset resin, which may include an epoxy resin, a polyester resin, or combinations thereof. In an exemplary embodiment, the resin may include one of Polyester resin, Polyurethanes, Polyurea/polyurethane hybrids, Vulcanized rubber, Bakelite, Duroplast, Urea-formaldehyde foam, Melamine resin, Diallyl-phthalate (DAP), Epoxy resin, Epoxy novolac resins, Benzoxazines, Polyimides and Bismaleimides, Cyanate esters or polycyanurates, Mold or mold runners, Furan resins, Silicone resins, Thiolyte, Vinyl ester resins, and combinations thereof. In an exemplary embodiment, the hardener may include a thermoset resin. In an exemplary embodiment, the hardener may include EPOLAM 2017 resin, EPOLAM 2018, or combinations thereof.

Referring to FIG. 1F, method 100 may include fabricating a nanofiber yarn (step 102), forming a nanofiber yarn layer by aligning the nanofiber yarn in form of a layer (step 104), forming a prepreg laminated structure by interleaving the nanofiber yarn layer into the plurality of prepregs (step 150), forming a prepreg composite laminate (step 160), and curing the prepreg composite laminate (step 170).

Figure 1G:
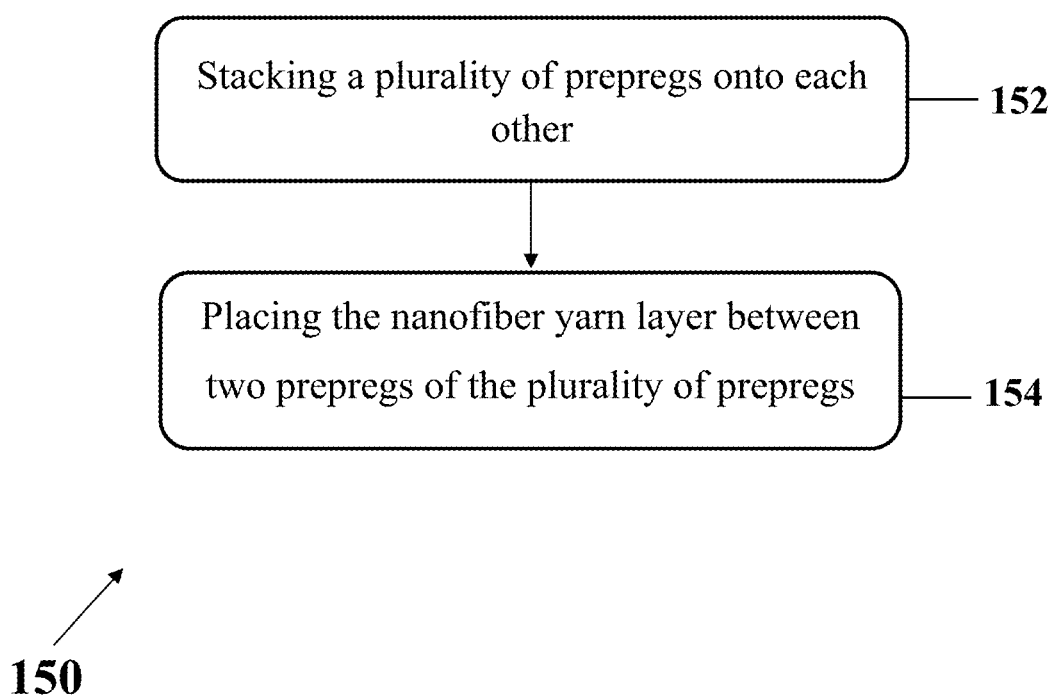
FIG. 1G illustrates a process for forming the prepreg laminated structure, consistent with one or more exemplary embodiments of the present disclosure.

Step 150 may include forming the prepreg laminated structure by interleaving the nanofiber yarn layer into the plurality of prepregs. FIG. 1G shows an exemplary process for forming the prepreg laminated structure (step 150), consistent with one or more exemplary embodiments of the present disclosure. Forming the prepreg laminated structure may include stacking a plurality of prepregs onto each other (step 152) and placing the nanofiber yarn layer between two respective prepregs of the plurality of prepregs (step 154).

Figure 1H:
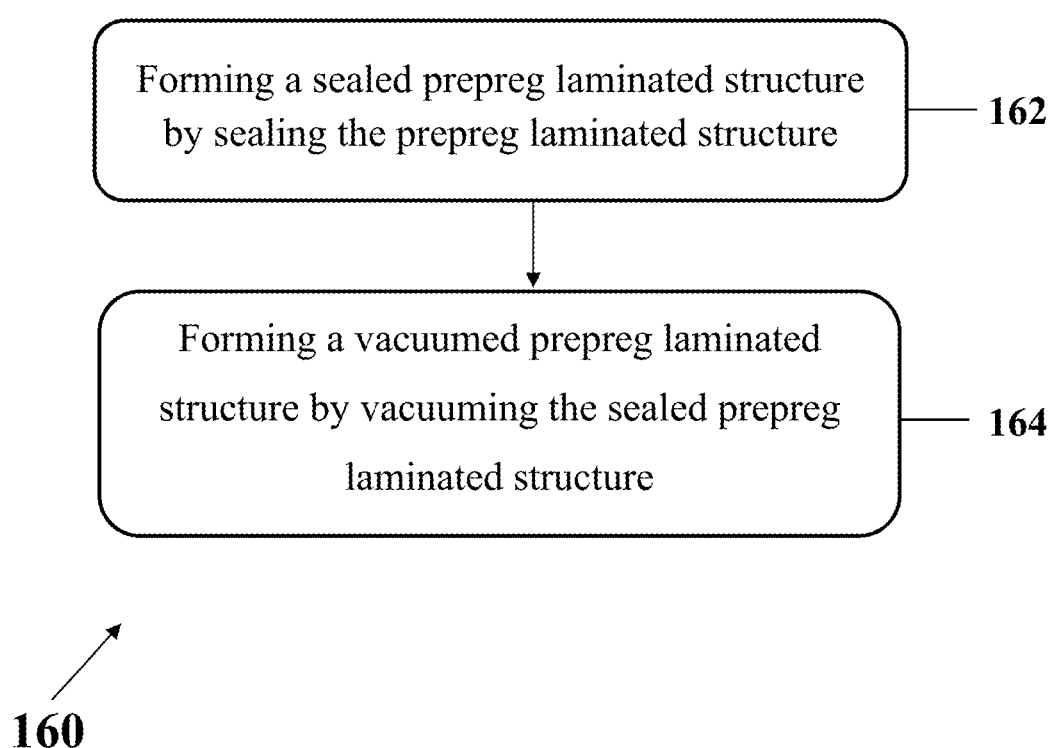
FIG. 1H illustrates an implementation of forming the prepreg composite laminate, consistent with one or more exemplary embodiments of the present disclosure.

Step 160 may include forming the prepreg composite laminate. FIG. 1H shows an exemplary process for forming the prepreg composite laminate (step 160), consistent with one or more exemplary embodiments of the present disclosure. Forming the prepreg composite laminate (step 160) may include forming a sealed prepreg laminated structure (step 162) and forming a vacuumed prepreg laminated structure by vacuuming the sealed prepreg laminated structure (step 164).

Step 170 may include curing the prepreg composite laminate. In an exemplary embodiment, curing the prepreg composite laminate may include maintaining the vacuumed prepreg composite laminate at a temperature between about 50° C. and about 200° C. for about one week.

In an exemplary embodiment of the present disclosure, a toughened composite laminate is disclosed. The toughened composite laminate may include a plurality of fabric layers, a nanofiber yarn layer, and a resin matrix. The nanofiber yarn layer may be interleaved between two respective fabric layers of the plurality of fabric layers. The resin matrix may include a resin and a hardener, wherein each fabric layer of the plurality of fabric layers and the nanofiber yarn layer may be impregnated by the resin matrix.

In an exemplary embodiment, the plurality of fabric layers may include one of glass fabric layers, carbon fabric layers, Aramid fabric layers, Kenaf fabric layers, and combinations thereof. In an exemplary embodiment, the nanofiber yarn layer may include a layer of aligned nanofiber yarn, which may include twisted nanofibers including one of Nylon nanofibers, Polyamide (PA) nanofibers, and combinations thereof. In an exemplary embodiment, the twisted nanofibers may include Nylon 66 nanofibers or PA66 nanofibers. In an exemplary embodiment, the resin may include a thermoset resin, for example, one of an epoxy resin, a polyester resin, and combinations thereof.

Example 1: Fabricating a Composite Laminate Toughened by Aliened Nanofiber Yarns In this example, PA66 electrospun nanofiber yarns were fabricated by twist inserting, then the yarns were aligned on a paperboard frame at about ±45° direction in form of a layer. The PA66 nanofiber yarn layer aligned on the paperboard frame at ±45 direction was applied as toughener in structure of exemplary glass/epoxy composite laminates. Consequently, the fracture toughness of the glass/epoxy composites under mode I and mode II loadings was significantly increased by interleaving the fabricated PA66 nanofiber yarn between the composite layers.

In this example, a PA66 polymer (with $M_w$=about 262.35 g/mol) solution was prepared with a concentration of about 14 wt % in formic acid as the solvent. A homogeneous solution was achieved by stirring the components for approximately five (5) hours at room temperature. The characteristics of different components of the electrospinning setup utilized for producing PA66 nanofibers; thereby, forming PA66 nanofibers yarn, including the distances between them and the other applied adjustments, is summarized in Table 1 below.

TABLE 1

Characteristics and conditions of different components of exemplary electrospinning setup.

| Characteristics of different components of the electrospinning setup | |
|---|---|
| Syringe pumps | TOP-5300 |
| Flat-tipped needle | 22-gauge, ID = 0.4 mm, OD = 0.7 mm |
| Neutral cylinder | 6 and 30 cm diameter and length |
| Maximum voltage of high voltage supplier | 25 kV |

| Electrospinning conditions | |
|---|---|
| Distance between nozzles and front surface of winding roller (cm) | 20 |
| Distance between neutral cylinder and front surface of winding roller (cm) | 23 |
| Distance between neutral cylinder and nozzles (cm) | 3 |
| Vertical distance of nozzles from ground (cm) | 20 |
| Distance between two needles (cm) | 18 |
| Applied voltage (kV) | 10.5 |
| Feeding rate (ml/h) | 0.2 |
| Winding speed (cm/min) | 5.5 |
| Rotational speed (rpm) | 220 |
| TPM (twist per meter) | 4000 |

Figure 5:
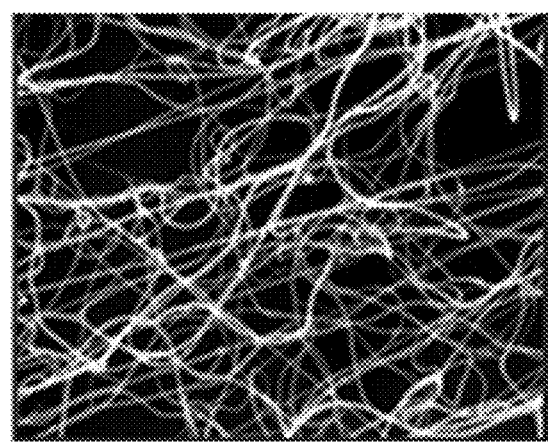
FIG. 5 illustrates a scanning electron microscope (SEM) image representing the orientation of exemplary fabricated PA66 nanofibers obtained through the electrospinning technique before twist inserting, consistent with one or more exemplary embodiments of the present disclosure.

FIG. 5 shows a scanning electron microscope (SEM) image illustrating the orientation of exemplary fabricated PA66 nanofibers obtained through the electrospinning technique before twist inserting, consistent with one or more exemplary embodiments of the present disclosure.

Figure 6A:
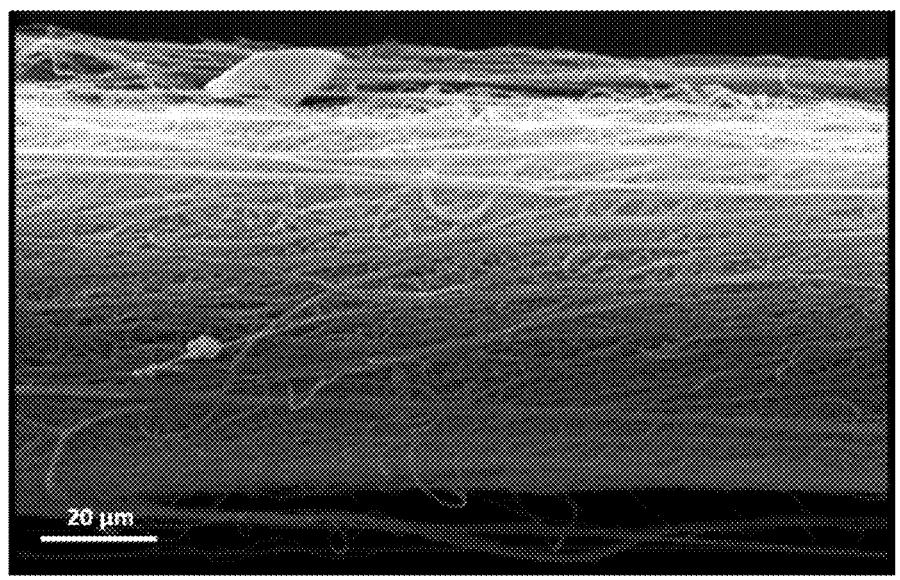
FIG. 6A illustrates a SEM image of exemplary fabricated PA66 nanofiber yarn with a magnifications of 625×, consistent with one or more exemplary embodiments of the present disclosure.
Figure 6B:
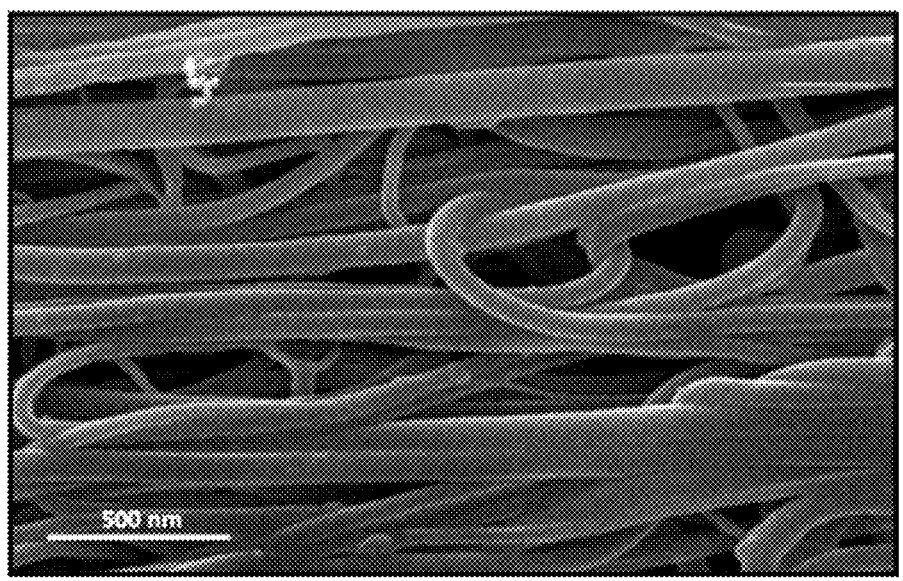
FIG. 6B illustrates a SEM image of exemplary fabricated PA66 nanofiber yarn with a magnifications of 10000×, consistent with one or more exemplary embodiments of the present disclosure.

FIGS. 6A and 6B show exemplary SEM images representing morphology of one example of electrospun nanofiber yarn that was fabricated pursuant to the present disclosure via twist inserting to the plurality of nanofibers shown in FIG. 5. FIG. 6A shows an exemplary SEM image of exemplary fabricated PA66 nanofiber yarn with a magnifications of 625× and FIG. 6B shows an exemplary SEM image of exemplary fabricated PA66 nanofiber yarn with a magnifications of 10000×, consistent with one or more exemplary embodiments of the present disclosure.

Figure 7A:
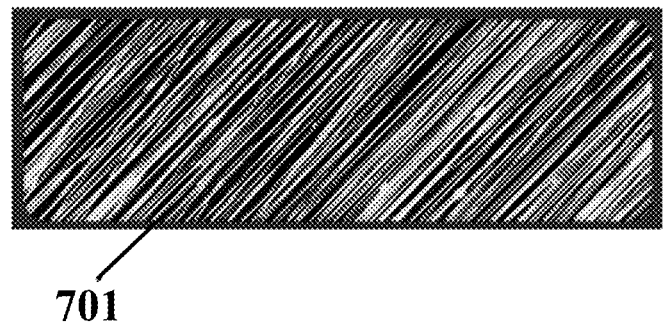
FIG. 7A illustrates an optical image of exemplary first layer of aligned PA66 nanofiber yarn at +45° direction, consistent with one or more exemplary embodiments of the present disclosure.
Figure 7B:
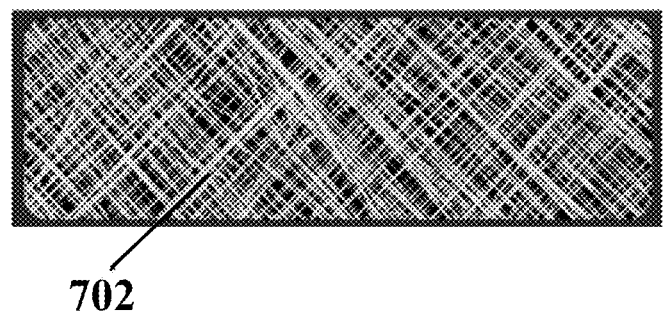
FIG. 7B illustrates an optical image of exemplary double aligned layer of PA66 nanofiber yarn at ±45 direction, consistent with one or more exemplary embodiments of the present disclosure.
Figure 7C:
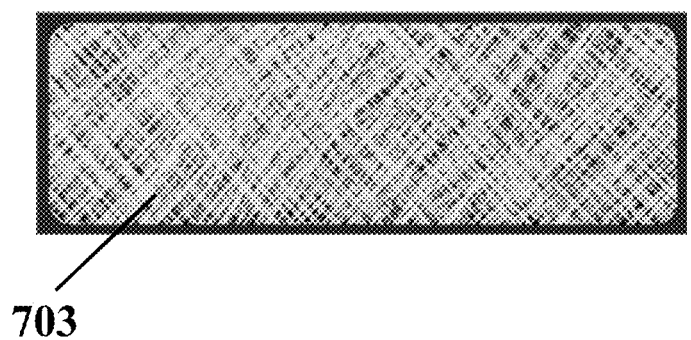
FIG. 7C illustrates an optical image of exemplary PA66 nanofiber yarn layer formed by aligning the PA66 nanofiber yarn at ±45° direction for several times, consistent with one or more exemplary embodiments of the present disclosure.

FIGS. 7A-7C show optical images of an exemplary step by step alignment of nanofiber yarns, shown in FIGS. 6A and 6B, on a 50 mm×110 mm paperboard frame at a ±45° direction, consistent with one or more exemplary embodiments of the present disclosure. FIG. 7A shows an exemplary first layer 701 of aligned PA66 nanofiber yarn at +45° direction, consistent with one or more exemplary embodiments of the present disclosure. FIG. 7B shows an exemplary second layer of aligned PA66 nanofiber yarn at −45° direction; thereby, forming aligned double layer 702 of PA66 nanofiber yarn at ±45 direction, consistent with one or more exemplary embodiments of the present disclosure. FIG. 7C shows an exemplary resulted PA66 nanofiber yarn layer 703 formed by aligning the PA66 nanofiber yarn at ±45° direction at numerous instances and generating four layers of the PA66 nanofiber yarn onto each other, consistent with one or more exemplary embodiments of the present disclosure. The PA66 nanofiber yarn layer 703 may have a density of about 0.0318 g/m² of nanofiber yarns on the paperboard frame and a thickness of about 220 µm.

To fabricate the toughened composite laminate, a woven glass fabric (400 g/m²), an EPOLAM 2017 resin, an EPOLAM 2018 hardener, and the PA66 nanofiber yarn layer 703, fabricated as described hereinabove and aligned on paperboard frame at ±45 direction, may be used to prepare a reinforced composite. A double cantilever beam (DCB) sample may be prepared for tests under mode I loading and an end notched flexure (ENF) sample may be prepared for tests under mode II loading. Average dimensions of the exemplary samples are summarized in Table 2 below.

In an exemplary case, for manufacturing the composite laminate samples, 12 layers of woven glass fabric were stacked on each other; the PA66 nanofiber yarn layer 703 and a 30 µm Teflon sheet (for producing initial crack) were put between the mid-layers (between 6th and 7th layers). Test panels were prepared by using a vacuum bag for injection of resin/hardener mixture. Samples were cut from the laminates using water jet. Samples were cured at room temperature for one week. For each configuration, 5 samples were manufactured and tested.

TABLE 2

Average dimensions of the samples.

| | Length (mm) | Width (mm) | Thickness (mm) | Initial crack length (mm) |
|---|---|---|---|---|
| Ref. of DCB | 150 | 18.97 | 3.35 | 50.23 |
| DCB | 150.1 | 18.97 | 3.45 | 50.55 |
| Ref. of ENF | 149.69 | 18.95 | 3.44 | 50 |
| ENF | 149.58 | 19.02 | 3.48 | 50 |

Example 2: Mode I and II Fracture Tests of Composite Laminates Toughened by Aliened Nanofiber Yarns In this example, exemplary composite laminates toughened by aligned nanofiber yarns in accordance with EXAMPLE 1, were tested by mode I and mode II fracture tests that may be carried out in a computer-controlled servo-hydraulic universal testing machine. The crosshead speed may be about 3 mm/min for DCB and ENF tests. The energy release rate for mode I fracture ($G_I$) testing may be obtained in accordance to the ASTM 5528 as:

$$G_I = 3P\delta/2ba$$

Where, P may be the load, δ may be the displacement, b may be the sample width and a may be the distance between the loading point and the crack tip.

The direct beam theory may be used to calculate the energy release rate for mode II fracture ($G_{II}$) using the following expression:

$$G_{II} = 9a^2 P\delta / 2b(2L^3 + 3a^3)$$

Where, a may be the crack length, P may be the load, δ may be the displacement, b may be sample width and L may be half of the span (the distance between two supports). Table 3 shows exemplary results of the DCB and ENF tests for exemplary fabricated toughened composite laminates with the nanofiber yarn layer in comparison with a reference composite laminate, which was not toughened and was not included a nanofiber yarn layer.

TABLE 3

Results of DCB and ENF tests.

| | | Reference | Toughened composite laminates | Increase (%) |
|---|---|---|---|---|
| DCB | Maximum load (N) | 29.44 | 125.17 | 325 |
| | Fracture toughness ($G_I$) (J/m$^2$) | 367.8 | 6443 | 1652 |
| ENF | Maximum load (N) | 549.58 | 1908.12 | 247 |
| | Fracture toughness ($G_{II}$) (J/m$^2$) | 2776 | 35147 | 1166 |

Figure 8:
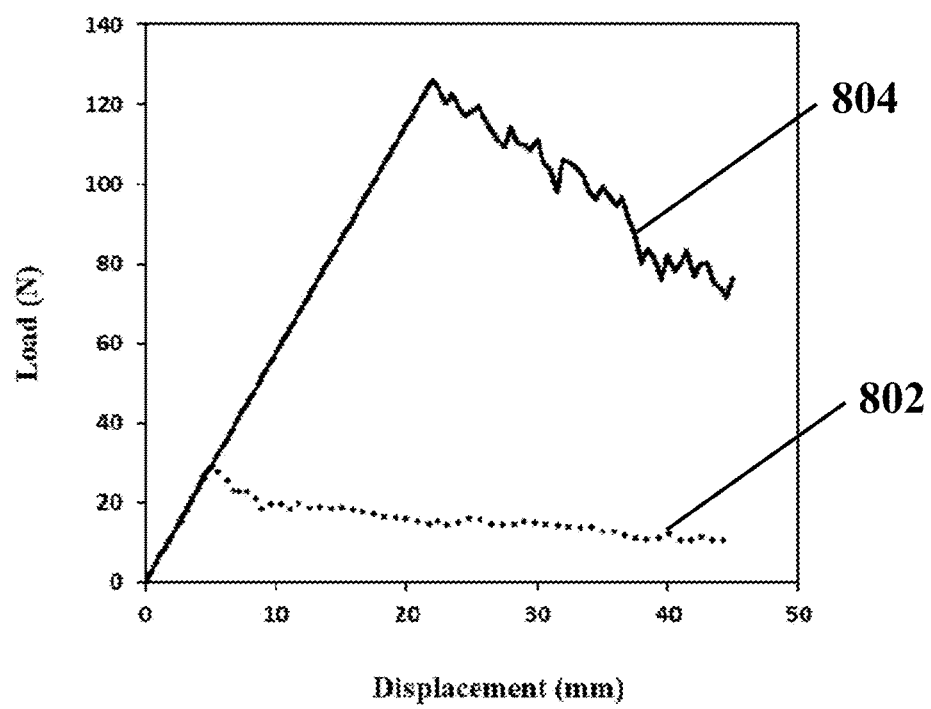
FIG. 8 illustrates average load-displacement curves obtained from a DCB test for an exemplary toughened composite laminate and a reference composite laminate, consistent with one or more exemplary embodiments of the present disclosure.

FIG. 8 shows an example curve of the average load vs. displacement of exemplary toughened composite laminate (curve 804) in comparison with a reference curve 802 for reference composite laminate obtained from a DCB test, consistent with one or more embodiments of the present disclosure. It may be observed that the maximum load of the toughened composite under mode I loading was increased about 325% in comparison with the reference composite.

Figure 9:
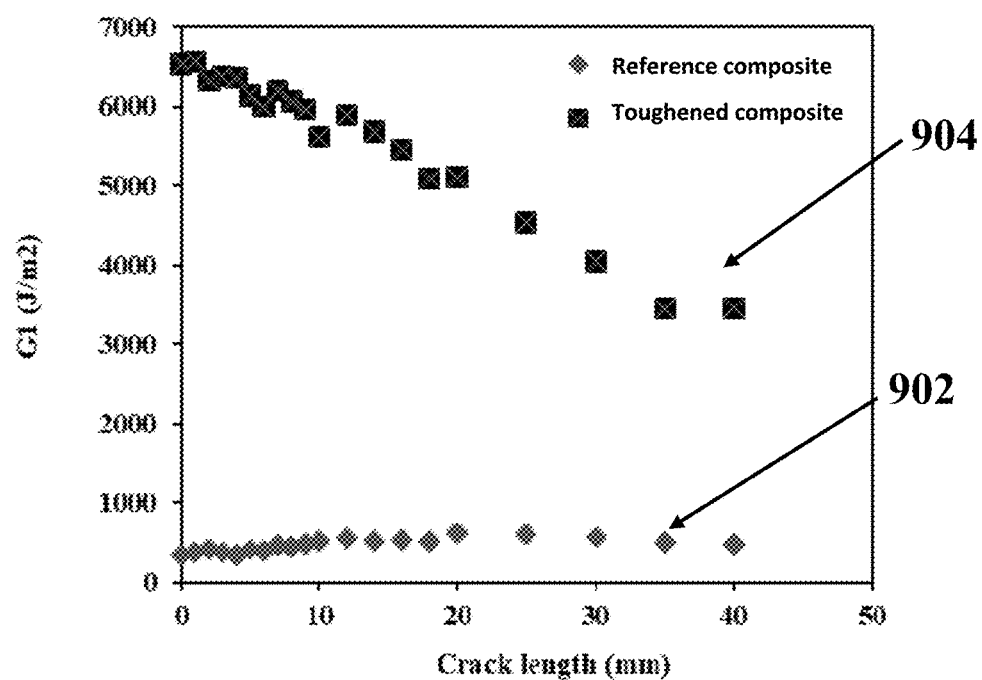
FIG. 9 illustrates fracture toughness ($G_f$)-crack length curves of an exemplary toughened composite laminate in comparison with exemplary reference composite laminate under mode I loading, consistent with one or more exemplary embodiments of the present disclosure.

FIG. 9 illustrates fracture toughness ($G_I$)-crack length curves of an exemplary toughened composite laminate (curve 904) in comparison with a reference composite laminate (curve 902) under mode I loading, consistent with one or more exemplary embodiments of the present disclosure. It may be observed that the fracture toughness of the toughened composite laminate was increased about 1652% in comparison with the reference composite laminate.

Figure 10:
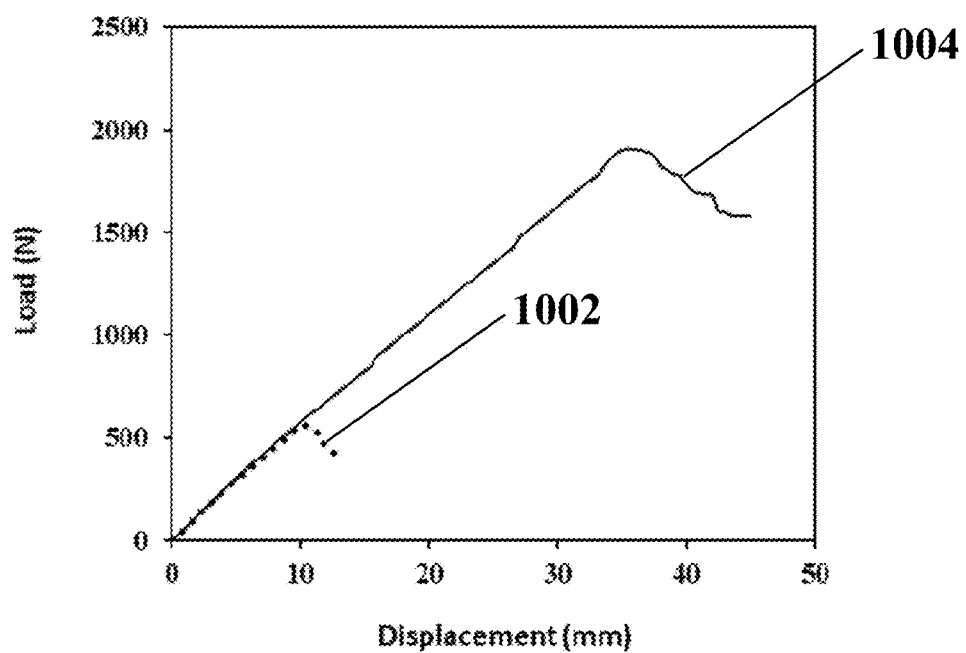
FIG. 10 illustrates average load-displacement curves of exemplary toughened composite laminate and reference composite laminate obtained from an ENF test, consistent with one or more exemplary embodiments of the present disclosure.

Moreover, the PA66 nanofiber yarn layer may perform noticeably as a toughener in a composite laminate under mode II loading that may be observable from FIG. 10. FIG. 10 shows average load-displacement curves of exemplary toughened composite laminate (curve 1004) and reference composite laminate (curve 1002) obtained from an ENF test, consistent with one or more exemplary embodiments of the present disclosure. It may be observed that using the nanofiber yarn layer may result in about 247% promotion of maximum load and about 1166% promotion of fracture toughness of the toughened composite laminate in comparison with the reference composite laminate.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for fabricating a composite laminate, comprising:
fabricating a nanofiber yarn, comprising:
fabricating a plurality of nanofibers utilizing an electrospinning technique;
forming the nanofiber yarn by applying twist levels in a range between 1000 TPM (twist per meter) and 9000 TPM to the plurality of nanofibers; and
collecting the nanofiber yarn by moving the nanofiber yarn towards a take-up roller,
wherein forming the nanofiber yarn by twist inserting to the plurality of nanofibers and moving the nanofiber yarn towards the take-up roller are done simultaneously;
forming a nanofiber yarn layer with a thickness in a range between 100 μm and 500 μm by aligning the nanofiber yarn in form of a layer, comprising:
forming the nanofiber yarn layer by aligning the nanofiber yarn on a frame in form of a plurality of couple layers of the nanofiber yarn onto each other with a crossed ±45 degree angle for each respective couple layers; and
separating the nanofiber yarn layer from the frame;
forming a laminated structure by interleaving the nanofiber yarn layer into a plurality of fabric layers, comprising:
stacking the plurality of fabric layers onto each other; and
placing the nanofiber yarn layer between two fabric layers of the plurality of fabric layers;
forming the composite laminate by subjecting the laminated structure to a vacuum infusion process (VIP), the VIP comprising:
forming a sealed laminated structure by sealing the laminated structure;
forming a vacuumed laminated structure by vacuuming the sealed laminated structure; and
introducing a resin matrix into the vacuumed laminated structure; and curing the composite laminate.

2. A method for fabricating of a composite laminate, comprising:
fabricating a nanofiber yarn;
forming a nanofiber yarn layer by aligning the nanofiber yarn in form of a layer, comprising:
forming the nanofiber yarn layer with a thickness in a range between 100 μm and 500 μm by iteratively repeating forming a respective first aligned layer and forming a respective second aligned layer after each other until the thickness is reached, wherein:
forming the respective first aligned layer comprises aligning the nanofiber yarn with a +45 degree angle on the frame, and
forming the respective second aligned layer comprises aligning the nanofiber yarn with a −45 degree angle on the frame; and
separating the nanofiber yarn layer from the frame;
forming a laminated structure by interleaving the nanofiber yarn layer into a plurality of fabric layers, comprising:
stacking the plurality of fabric layers onto each other; and
placing the nanofiber yarn layer between two fabric layers of the plurality of fabric layers;
forming the composite laminate by subjecting the laminated structure to a vacuum infusion process (VIP), the VIP comprising:
forming a sealed laminated structure by sealing the laminated structure;
forming a vacuumed laminated structure by vacuuming the sealed laminated structure; and
introducing a resin matrix into the vacuumed laminated structure; and curing the composite laminate.

3. The method of claim 2, wherein fabricating the nanofiber yarn comprises:
fabricating a plurality of nanofibers by electrospinning technique;
forming the nanofiber yarn by twist inserting to the plurality of nanofibers comprising applying twist levels in a range between 1000 TPM (twist per meter) and 9000 TPM to the plurality of nanofibers; and
collecting the nanofiber yarn by moving the nanofiber yarn towards a take-up roller,
wherein forming the nanofiber yarn by twist inserting to the plurality of nanofibers and moving the nanofiber yarn towards the take-up roller are done simultaneously.

4. The method of claim 3, wherein the plurality of nanofibers comprises a plurality of polymeric nanofibers made of at least one of Nylon nanofibers, Polyamide (PA) nanofibers, and combinations thereof.

5. The method of claim 4, wherein the plurality of nanofibers comprises at least one of Nylon 66 nanofibers, PA66 nanofibers, and combinations thereof.

6. The method of claim 2, wherein the plurality of fabric layers comprises at least one of glass fabric layers, carbon fabric layers, Aramid fabric layers, Kenaf fabric layers, and combinations thereof.

7. The method of claim 2, wherein forming the sealed laminated structure by sealing the laminated structure comprises sealing the laminated structure by enclosing the laminated structure with a paste.

8. The method of claim 2, wherein forming the vacuumed laminated structure comprises vacuuming the sealed laminated structure by a vacuum pump to a pressure of 0.8 bar.

9. The method of claim 2, wherein the resin matrix comprises a resin and a hardener.

10. The method of claim 9, wherein:
the resin comprises a thermoset resin, and
the thermoset resin comprises at least one of an epoxy resin, a polyester resin, and combinations thereof.

11. The method of claim 2, wherein introducing the resin matrix into the vacuumed laminated structure comprises suction of the resin matrix into the vacuumed laminated using a vacuum pump.

12. The method of claim 2, wherein curing the composite laminate comprises maintaining the composite laminate at a temperature between 20° C. and 260° C.

* * * * *